United States Patent Office 3,190,856
Patented June 22, 1965

3,190,856
POLYAMIDES FROM BENZOPHENONETETRA-
CARBOXYLIC ACIDS AND A PRIMARY DI-
AMINE
Edward Lavin, Longmeadow, Albert H. Markhart, Wilbraham, and Robert E. Kass, Springfield, Mass., assignors to Shawinigan Resins Corporation, Springfield, Mass., a corporation of Massachusetts
No Drawing. Filed June 27, 1961, Ser. No. 119,846
4 Claims. (Cl. 260—65)

This invention relates to novel polyamides; more particularly, it relates to polyamides which are the polymeric condensation products of a tetracarboxylic acid containing the benzophenone radical with a primary diamine.

Polyamides are well known and although they have found wide use in a variety of applications, they suffer from several deficiencies. For example, the oxidative stability of aliphatic polyamides is not good. Aromatic polyamides are better in this respect but then their poor solubility and their high melting point renders them rather difficult to process. In addition, the known polyamides are not readily crosslinked, i.e., converted into an insoluble and infusible solid state, a very desirable property in many applications.

Accordingly, the primary object of this invention is to obtain a readily soluble aromatic polyamide which can be easily applied to various uses by virtue of its solubility. Another object is to create new polyamide compositions which can be cured into insoluble, infusible, flexible, thermally and oxidatively stable products.

These and other objects have been achieved by new compositions of matter which are the polyamide condensation products of suitable dianhydrides, or compounds that can readily regenerate dianhydrides, with suitable diamines, and which are readily convertible by heat into insoluble, infusible and yet flexible crosslinked materials.

As with most polyamides, the typical new product may be considered to be derived from a polycarboxylic acid and a poly primary amine, as illustrated by the following formulae:

$$\text{HOOC—R—COOH} + \text{H}\underset{|}{\text{N}}\text{—R'—}\underset{|}{\text{N}}\text{H} \longrightarrow$$
$$[\text{—}\underset{|}{\text{N}}\text{—}\underset{\|}{\overset{\text{O}}{\text{C}}}\text{—R—}\underset{\|}{\overset{\text{O}}{\text{C}}}\text{—}\underset{|}{\text{N}}\text{—R'—}]_n$$

The particular reaction product of this invention, however, are very special examples of polyamides because the R group in the above formulae is a benzophenone radical which possesses, in addition to the two carboxyl groups involved in amide linkages, two additional carboxyl groups which are in an ortho position with respect to the amide groups. Such molecules are obtained by the use directly or indirectly, of a benzophenonetetracarboxylic acid anhydride.

The extra carboxyl groups enable the polymer, which is soluble, to be heat treated at any time, either in the original condensation reaction system or later after application of the polymer to its ultimate use (e.g., coating of a given substrate), into an insoluble, infusible and thermally resistant product.

The carbonyl group situated between the aromatic rings of the tetracarboxylic acids chosen offers flexibility and solubility to the initial condensation product:

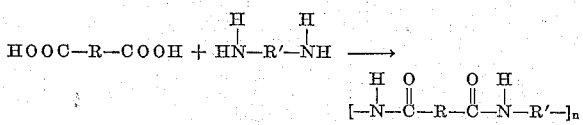

In the preparations where the benzophenonetetracarboxylic acid anhydride is condensed with 4,4'-oxydianiline, for instance, the R' group in the above formulae would represent the following structure:

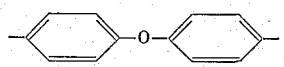

The presence of free carboxyl groups in the initial reaction product, the polyamide, can be readily shown by its solubility in aqueous base and its insolubility in aqueous acid. Once the polyamide has been cured, however, it is no longer soluble either in acid, base or for that matter in any of many organic solvents tested.

It has been found advantageous to react the diamine with the benzophenonetetracarboxylic acid dianhydride in a solvent for the resulting polyamide. The polyamide solution thereby obtained can be used directly for application to various surfaces, e.g., metal, fabric, and so on, where, upon heating, the solvent evaporates and the polymer is converted into its final insoluble form.

Examples are now provided to illustrate various embodiments of the invention. It is understood that these are not restrictive in any manner.

EXAMPLE 1

Preparation of polyamide solution

Technical 4,4'-oxydianiline was purified by recrystallization from dimethylacetamide-water. 3,3',4,4'-benzophenonetetracarboxylic acid dianhydride (BPDA) was dehydrated by heating at 250° C. and 80 mm. pressure for 1.5 hours.

BPDA, 16.1 g., was dissolved in 74 ml. of N-methylpyrrolidone in a three-neck, round bottom flask fitted with a thermometer, a stirrer and an air condenser protected by a calcium chloride tube. To the flask was added a solution of 13.4 g. of oxydianiline in 74 ml. of dimethylacetamide. The reaction mixture was held at 50° C. with stirring for 16 hours. The resulting polyamide solution was found to have a Brookfield viscosity of 150 centipoises at 25° C.

This solution, applied to aluminum, dried at 160° C. for 10 minutes and subsequently at 300° C. for 5 minutes, formed a light-amber, flexible and adherent film. The aging of this film at 300° C. in a circulating air oven for 213 hours caused a total weight loss of only 1.2%.

EXAMPLE 2

The polyamide solution of Example 1 was applied to AWG No. 18 copper wire (0.0403 inch diameter) and cured by standard wire enameling techniques to produce a magnet wire film possessing great abrasion and burn-out resistance and a very high cut-through temperature.

The abrasion resistance test consists essentially in scraping the insulated wire sample with a steel needle loaded with a set weight which is varied according to the "build" or thickness of insulation of the coated wire. The tester records the number of strokes and shuts off when contact is made between the needle and the bared wire. The insulation on the wire of Example 2 withstood a total of 294 strokes (at a 700 g. load) before wearing out.

The cut-through temperature, >350° C. for Example 2 wire, is an indirect measure of the tendency of the plastic insulation to flow under the influence of heat. In a motor, such flow can materially affect the thickness of insulation layers and even cause arcing. The cut-through temperature is determined by applying a constant pressure at a 90° C. crossover of two strands of the wire in question, by means of a spindle and weight. The temperature is increased at a rate of approximately 10° C. per minute until a wire to wire contact is established as indicated by the ringing of a bell in series with a 12 volt potential between the two wire strands.

The burn-out resistance is a measure of the effect of electrical overload on the insulation of wire. Typically, the wire to be tested is subjected to a current of 40 amperes for a predetermined period after which the insulative capacity of the wire coating is measured. The present wire retained a dielectric strength greater than 1000 volts after subjection to a 40 ampere current flow for 10 minutes, an excellent performance.

EXAMPLE 3

The purified materials and the equipment of Example 1 were used again. BPDA, 24.1 g., and the dianiline, 15 g., were placed in the flask. N-methylpyrrolidone, 88.5 ml., was added to effect solution of the monomers and begin the condensation reaction leading to the polyamide. After fifty minutes, 97.6 ml. of dimethylacetamide was added to reduce the viscosity of the solution. The reaction mixture was held for six hours at 50° C. and the mixture was then filtered. The Brookfield viscosity of the product solution was determined to be 3800 centipoises at 25° C.

This solution was coated on No. 18 copper wire and cured, using conventional wire enameling procedures. The properties of the film coated wire were as follows:

| | |
|---|---|
| Film build | 3.1 mils. |
| Flex after 25% elongation | 1×. |
| Jerk test | Passes. |
| Repeated scrape abrasion, 700 g. load | 82 strokes. |
| Cut-through | >350° C. |
| Heat shock, 160° C. | 1×. |
| Toluene-alcohol boil | Passes. |
| Freon resistance | Excellent. |
| Flex life, 200° C. | >168 hours. |
| 1-kilovolt life at 330° C. | 219 hours. |
| Burn-out resistance, 40 amperes: | |
| for 5 minutes | Retains 8500 volt strength. |
| for 10 minutes | Retains 1100 volt strength. |

The film build is the increase in the diameter of the wire due to the coating. The abrasion, cut-through and burn-out resistance tests have been described. The toluene-alcohol and the Freon resistance tests measure in a standard manner the effect of these organic systems on the wire insulation; the tests give, respectively, some indication of the completeness of cure of the enamel and of the potential behavior of the wire in refrigeration apparatus. The flexibility and the adherence of the coating are determined by the jerk test and the flex-after-elongation test. In the jerk test, the coated wire is suddenly broken by pulling and is then visually examined for cracks and loss of adherence especially in the region of the break. Similarly, in the elongation test, the wire is stretched by the desired amount (25%) and is then examined for cracks and loss of adherence.

The heat shock, flex life and 1-kilovolt life tests are measures of the thermal resistance of coated wire. In the first test, the wire is exposed to the indicated temperature for one hour; the diameter of the smallest mandrel around which the wire can be wrapped without causing the insulation to crack is reported in terms of wire diameters (e.g., 1× equals 0.0403 inch for No. 18 wire). In the other two thermal tests, the wire is exposed to the indicated temperatures until in the case of the flex life test, the wire has lost sufficient flexibility so that the insulation cracks upon wrapping around a mandrel twice its diameter but not enough to crack when wrapped around a mandrel three times its diameter. In the 1-kilovolt life test, the time of exposure necessary to cause the coating to fail as insulation upon application of a potential of 1000 volts for one second is reported.

In short, the wire prepared in the present example passes all these tests satisfactorily by virtue of possessing the properties shown in the above table.

EXAMPLE 4

Further evidence of the excellent thermal and oxidative stability of the polymers of the types in Examples 1 and 3, is seen in the low weight loss of cured film. Data of this sort is given below for two polymers. The weight loss was determined by baking out films as in Example 1 and placing them in a circulating air oven at 300° C. The following results will illustrate:

*Weight loss at 300° C.*

| Baked enamel film polymer | Loss at Hours Listed | |
|---|---|---|
| | Hours | Loss, percent |
| BPDA—4,4'-oxydianiline | 213 | 1.2 |
| | 717 | 3.1 |
| BPDA—p-phenylene diamine | 672 | 5.7 |

It was noted that even after aging for 600–700 hours at such a temperature, the films were still quite light yellow colored, in fact, almost of the original color, an indication of excellent thermal stability.

EXAMPLE 5

The polymer solution of Example 3 was diluted with dimethylacetamide and the polymer was precipitated by addition of methanol. The greenish granular resin was washed and dried. Elemental analysis results are shown below along with the values calculated for the following structure:

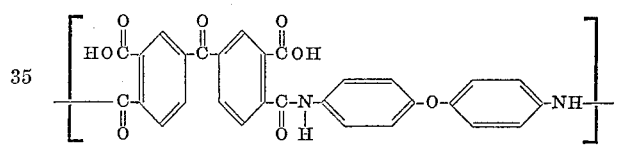

Calculated: C, 66.7%; H, 3.45; N, 5.36; O, 24.5. Found: C, 64.5%; H, 3.8; N, 5.1; O, 26.6 (by difference).

A portion of the isolated polymer was redissolved in N-methylpyrrolidone and the resulting solution was vacuum dried to form a film. The film was cured for one hour at 300° C. and was no longer soluble in aqueous base or in organic solvent such as the N-methylpyrrolidone, but the film was still flexible while possessing excellent chemical and thermal stability. Elemental analysis of this infusible polymer indicated that the percent carbon content was significantly higher than in the original soluble polymer and the percent oxygen content was significantly lower.

EXAMPLE 6

BPDA, 23.8 g. was refluxed for 15 hours in 61.2 g. anhydrous ethyl alcohol. The resulting solution was evaporated to dryness, leaving a soft, tacky mass of the diethyl ester of the tetracarboxylic acid. An amount of 7.52 g. of compound was dissolved in 23.4 g. cresol and the resulting solution was mixed with another solution of 3.64 g. 4,4'-oxydianiline in 14.6 g. cresol. This solution of monomers was immediately applied to a substrate, in this case a sheet of cold rolled steel, and the coated steel was baked for one hour at 300° C. in an oven. A clear, light yellow, tough, abrasion resistant, heat resistant and flexible film was produced which lost only 3.2% of its weight on further baking at 300° C. for 17 hours.

*Example 7*

In this preparation, 28.3 g. of the ethyl alcohol solution of the diethyl ester of BPDA of Example 6 was mixed with a solution of 2.65 g. of metaphenylene diamine in 22 g. water. The monomeric system was immediately spread on a sheet of cold rolled steel and, after baking for one hour at 250° C., produced a clear, light yellow, tough, abrasion and heat resistant film which suffered a weight loss of only 2.6% on further baking for 17 hours at 300° C.

Among the benzophenone derivatives that may be used in the practice of this invention are the dianhydrides of any of the geometrical isomers of the benzophenonetetracarboxylic acids sterically capable of yielding a dianhydride structure. This, in practice, limits the possibilities to compounds in which each ring has two carboxyl groups arranged in an ortho configuration. In cases where the contemplated application of the preparation is such that the obtention of the polyamide is superfluous, it may be found preferable to employ a lower alkyl diester of the tetracarboxylic acids just mentioned; the alkyl groups of such compounds should contain from one to 4 carbon atoms and there must be one of the resulting carbalkoxy group on each ring of the molecule. The use of such a diester, or for that matter, of any other derivative which can be converted to a usable dianhydride under the conditions that will permit the condensation leading to a polyamide, will allow the polyamide condensation to proceed in aqueous medium. Also, where the polyamide is not desired per se the condensation of the monomers may be carried out in the common organic solvents of the monomers rather than in the more expensive ones required to dissolve the polyamide, e.g., N-methylpyrrolidone and dimethylacetamide.

Furthermore, it has been found practical, for certain applications, to dispense altogether with the prepolymerization of the monomers to the polyamide; in such instances, the solution of monomers in water-alcohol, in acetone-alcohol, in cresol or other similar solvents is applied directly to the substrate and a satisfactory infusible, insoluble and flexible film is obtained upon baking the coated article.

The preferred acid components of the polyamides are, depending on the factors just elaborated, as well as on economic considerations, 3,3',4,4'-benzophenonetetracarboxylic acid anhydride and the diethyl ester of the corresponding acid.

Although any of the primary diamines can be employed to prepare the compositions of the invention, the actual choice of the diamino compound will depend perforce on the use intended for the polymer prepared. Of importance in this respect are the ultimate properties of the condensation product cured and uncured which can be affected by the nature of the diamino compound, i.e., solubility, fusibility, flexibility, thermal and oxidative stability. Obviously, the degree of these properties that will be satisfactory in one application may very well not be so in another. For instance, a much greater flexibility will be required of a coating for magnet wire and of a fiber than of a coating for a refrigerator or a stove pipe. With this in mind then the primary diamines that are useful include saturated aliphatic diamines containing up to 6 carbon atoms and aromatic diamines containing between 6 and 16 carbon atoms. Especially preferred for thermal stability are the aromatic diamines containing no aliphatic hydrogen atoms. Flexibility of the polymer, on the other hand, is favored by the use of compounds having two six-membered rings joined by a flexible linkage, for instance 4,4'-oxydianiline. Meeting one or both of these requirements are, for example, the diamines of the bivalent redicals of either benzene, naphthalene, biphenyl, diphenyl ether, ditolyy ether, diphenyl sulfide, diphenyl sulfone, diphenyl methane, diphenyl propane or benzophenone.

It is not inconsistent with this invention also to incorporate triamines in small amounts, as well as other compounds which lead to greater crosslinking of the polymer chains on curing.

The favored polyamides, from the point of view of the most satisfactory balance of properties for the widest variety of applications have been found to be the condensation products of 3,3',4,4'-benzophenonetetracarboxylic acid anhydride with one of the aromatic primary diamines containing no aliphatic hydrogen atoms that have just been enumerated. These polyamides should preferably show a Brookfield viscosity ranging from about 100 to 5000 centipoises as a 15% by weight solution in 1:1 dimethylacetamide and N-methylpyrrolidone at 25° C. When it is desired to obtain a solution of the polyamide, the condensation reaction should be carried at temperatures not exceeding 50° C. When, however, it is not essential to guard against crosslinking altogether, higher condensation temperatures are permissible. The polyamide resin, in turn, is cured into an insoluble and infusible resin at a temperature within the range of 200–500° C., the actual selection of the temperature depending in practice on the equipment used, the timing of the process and the degree of cure desired for the contemplated application.

Although the polymeric products of this invention are especially useful as surface coatings, their excellent and unusual properties make them available for such varied applications as impregnation of glass and other fabrics, the formation of fibers, free films, molded products and so on. In many applications, especially in surface coating, they may be employed in conjunction with other natural and synthetic resins, for instance in multi-ply coated magnet wire. In general, they will find acceptance wherever a resin is required possessing infusibility and insolubility coupled with flexibility, a rare combination of properties that is further enhanced by remarkable chemical and thermal stability.

What is claimed is:

1. A soluble, flexible polyamide resin that is the polymeric condensation product of an aromatic primary diamine containing from 6 to 16 carbon atoms with the dianhydride of an acid selected from the group consisting of 2,2',3,3'-, 2,3,3',4'-, 3,3',4,4'-benzophenonetetracarboxylic acids and mixtures thereof.

2. An insoluble, infusible and flexible resin obtained by the heat curing of the polyamide of claim 1 at a temperature selected from the range of 200 to 500° C.

3. A soluble, flexible polyamide resin that is the polymeric condenstion product of 4,4'-dioxyaniline with the dianhydride of 3,3',4,4'-benzophenonetetracarboxylic acid.

4. An insoluble, infusible and flexible resin obtained by the heat curing of the polyamide of claim 3 at a temperature selected from the range of 200 to 500° C.

References Cited by the Examiner
UNITED STATES PATENTS

| | | | |
|---|---|---|---|
| 2,279,752 | 4/42 | Jacobson | 260—78 |
| 2,862,836 | 12/58 | Oosterhout | 117—161 |
| 2,941,901 | 6/60 | Prill et al. | 117—161 |
| 3,037,966 | 6/62 | Chow et al. | 260—78 |
| 3,073,785 | 1/63 | Angelo | 260—78 |
| 3,075,942 | 1/63 | Bozer et al. | 260—65 |

LEON J. BERCOVITZ, *Primary Examiner.*

H. N. BURSTEIN, DONALD E. CZAJA, *Examiners.*